United States Patent
Ichihara (10) Patent No.: US 11,656,490 B2
(45) Date of Patent: May 23, 2023

(54) DISPLAY DEVICE (71) Applicant: Japan Display Inc., Tokyo (JP)

(72) Inventor: Kazuki Ichihara, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/831,903

(22) Filed: Jun. 3, 2022

(65) Prior Publication Data

US 2022/0390790 A1 Dec. 8, 2022

(30) Foreign Application Priority Data

Jun. 4, 2021 (JP) .............................. JP2021-094381

(51) Int. Cl.
*G02F 1/1333* (2006.01)
*G02F 1/1345* (2006.01)
*G02B 6/00* (2006.01)
*G02F 1/1334* (2006.01)

(52) U.S. Cl.
CPC ......... *G02F 1/133331* (2021.01); *G02B 6/00* (2013.01); *G02F 1/1333* (2013.01); *G02F 1/13454* (2013.01); *G02F 1/1334* (2013.01); *G02F 1/13452* (2013.01); *G02F 2201/086* (2013.01); *G02F 2201/50* (2013.01); *G02F 2202/28* (2013.01)

(58) Field of Classification Search
CPC ......... G02F 1/133331; G02F 1/133615; G02F 1/133368; G02F 1/133342; G02F 1/13454; G02F 1/1333; G02B 6/00
See application file for complete search history.

(56) References Cited

U.S. PATENT DOCUMENTS

| | | | | |
|---|---|---|---|---|
| 2005/0073642 A1* | 4/2005 | Dunn | ................ | G02F 1/133382 349/199 |
| 2013/0107143 A1* | 5/2013 | Dighde | ............. | G02F 1/133308 349/1 |
| 2019/0086709 A1* | 3/2019 | Lee | ........................ | G06F 1/1643 |

FOREIGN PATENT DOCUMENTS

| | | | | |
|---|---|---|---|---|
| CN | 103968306 A | * | 8/2014 | ................ F21V 9/14 |
| JP | 2021-033043 A | | 3/2021 | |

* cited by examiner

*Primary Examiner* — Jessica M Merlin
(74) *Attorney, Agent, or Firm* — K&L Gates LLP (57) ABSTRACT

According to one embodiment, a display device includes a display panel having a first surface, a second surface on a side opposite to the first surface, and a display area including pixels, a first cover member overlapping the display area and opposed to the first surface, and a second cover member overlapping the display area and opposed to the second surface. The first cover member has a first side surface close to a first end portion of the display panel, the second cover member has a second side surface close to the first end portion, and the first side surface is located between the first end portion and the second side surface in planar view.

12 Claims, 6 Drawing Sheets

DISPLAY DEVICE

CROSS-REFERENCE TO RELATED APPLICATIONS

This application is based upon and claims the benefit of priority from Japanese Patent Application No. 2021-094381, filed Jun. 4, 2021, the entire contents of which are incorporated herein by reference.

FIELD

Embodiments described herein relate generally to a display device.

BACKGROUND

In recent years, a display device comprising a display panel including a polymer dispersed liquid crystal layer (PDLC) has been proposed. The polymer dispersed liquid crystal layer can switch a scattering state in which light is scattered and a transmitted state in which light is transmitted. The display device can display images by switching the display panel to the scattering state. In contrast, the user can visually recognize a background through the display panel by switching the display panel to the transmitted state. Conventionally, reducing a frame portion located outside the display area, so-called narrowing the frame, has been required for the display device.

DETAILED DESCRIPTION

In general, according to one embodiment, a display device comprises a display panel having a first surface, a second surface on a side opposite to the first surface, and a display area including pixels, a first cover member overlapping the display area and opposed to the first surface, and a second cover member overlapping the display area and opposed to the second surface. The first cover member has a first side surface close to a first end portion of the display panel, the second cover member has a second side surface close to the first end portion, and the first side surface is located between the first end portion and the second side surface in planar view.

According to another embodiment, a display device comprises a display panel having a first surface, a second surface on a side opposite to the first surface, and a display area including pixels, a first cover member overlapping the display area and opposed to the first surface, a second cover member overlapping the display area and opposed to the second surface, and a printed circuit board opposed to the second surface, overlapping the first cover member in planar view, and not overlapping the second cover member in planar view.

According to the above configuration, a display device capable of allowing a frame to be narrowed can be provided.

One of embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention.

In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

In the embodiment, a first direction X, a second direction Y, and a third direction Z are defined as illustrated in the figure. The first direction X, the second direction Y, and the third direction Z are orthogonal to each other, but may cross each other at an angle other than 90 degrees. In addition, the third direction Z is defined as an upper or upward direction while a direction opposite to the third direction Z is defined as a lower or downward direction, in the present embodiment.

Expressions such as "a second component above a first component" and "a second component beneath a first component" mean that the second component may be in contact with the first component or may be located apart from the first component. Viewing an X-Y plane defined by the first direction X and the second direction Y is hereinafter referred to as planar view.

Figure 1:
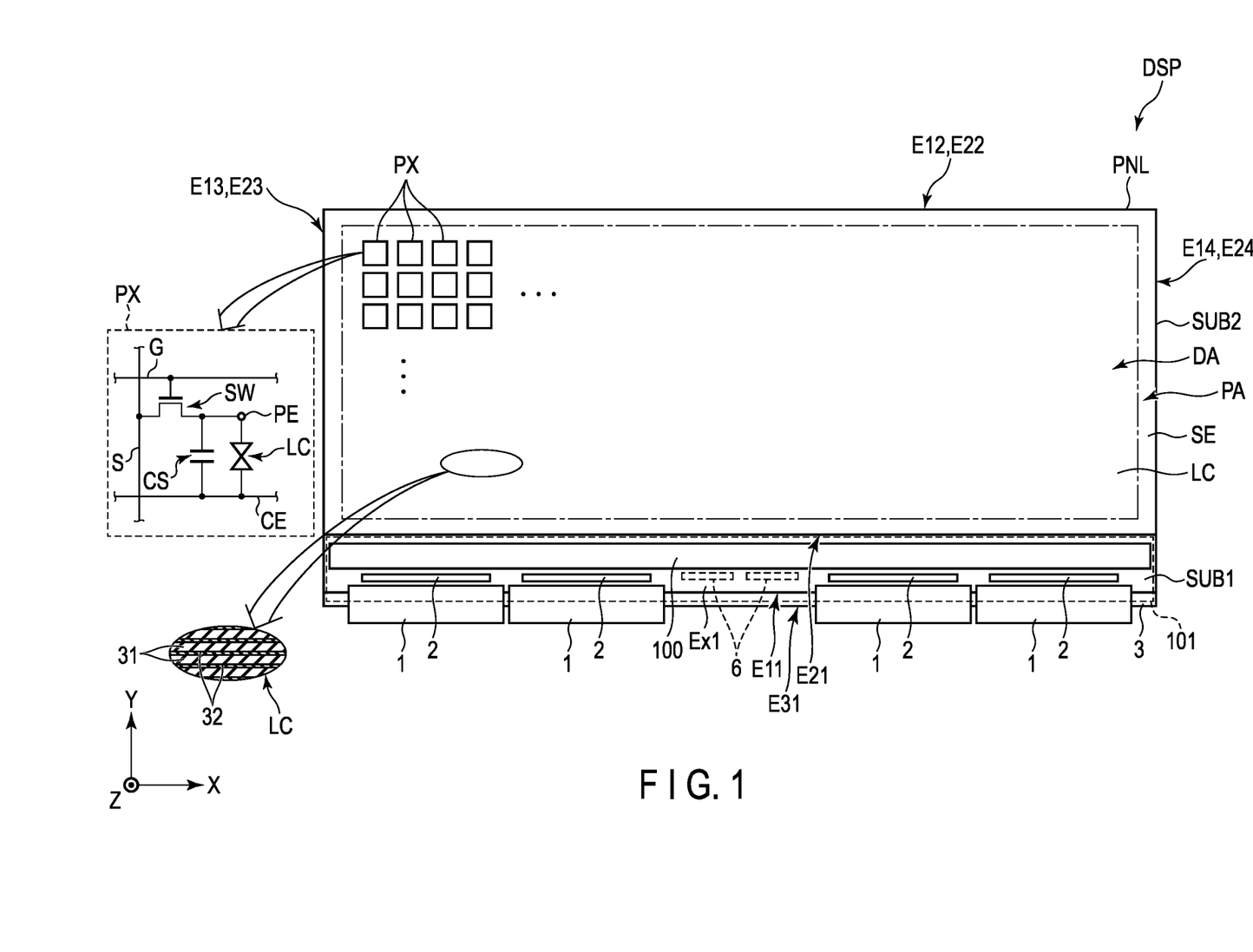
FIG. 1 is a plan view showing a configuration example of a display device of an embodiment.
Figure 2:
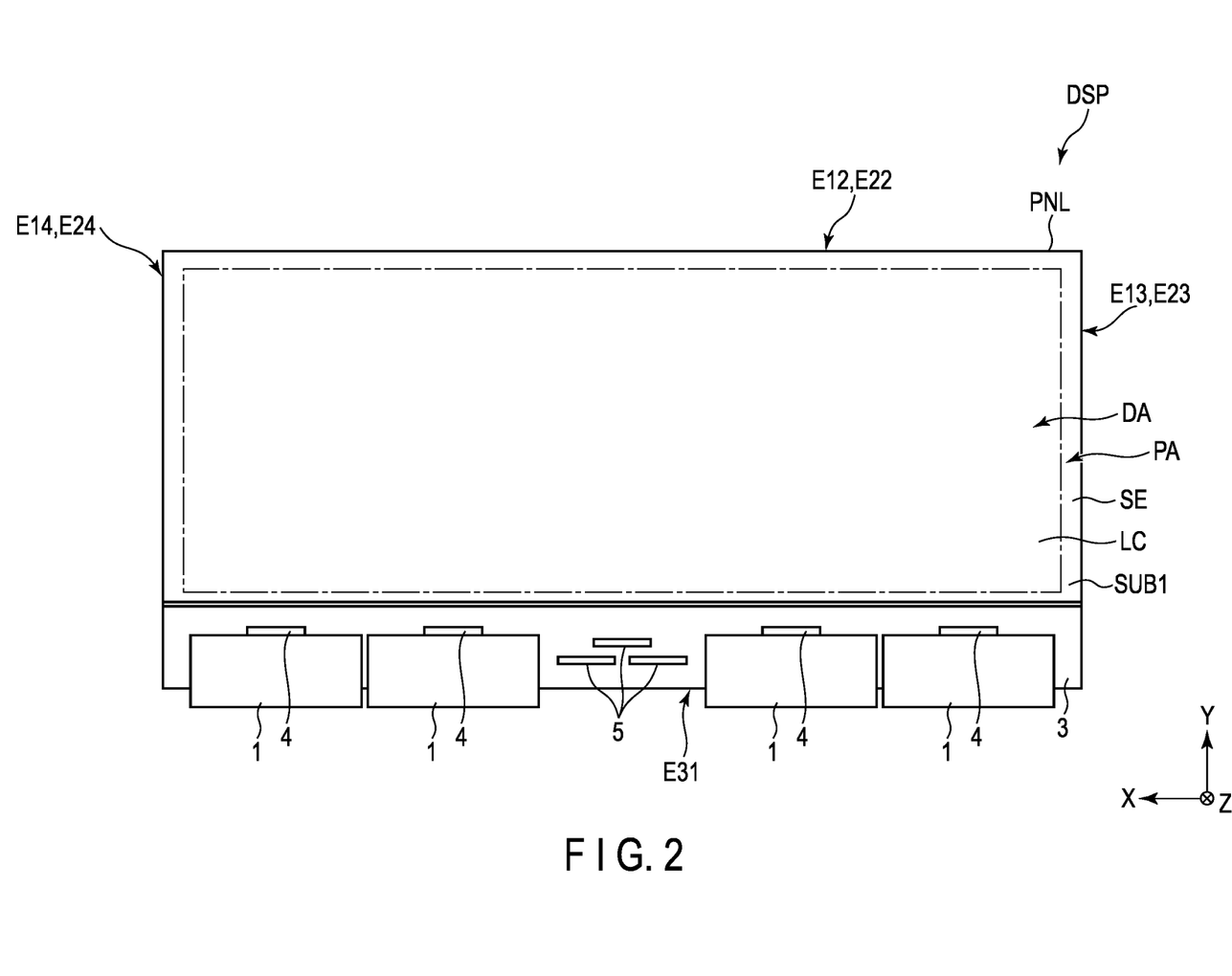
FIG. 2 is a bottom view showing a configuration example of the display device of the embodiment.

FIG. 1 is a plan view showing a configuration example of a display device DSP of the embodiment. FIG. 2 is a bottom view showing a configuration example of the display device DSP of the present embodiment. In the present embodiment, a liquid crystal display device employing polymer dispersed liquid crystal will be described as an example of the display surface DSP.

As shown in FIG. 1 and FIG. 2, the display device DSP comprises a display panel PNL including a polymer dispersed liquid crystal layer (hereinafter simply referred to as a liquid crystal layer LC), a flexible wiring board 1, an IC chip 2, a wiring board 3, and a light emitting module 100. The display device DSP further comprises a first cover member 30 and a second cover member 40, which will be described later.

The display panel PNL includes a first substrate SUB1, a second substrate SUB2, a liquid crystal layer LC, and a seal SE. The first substrate SUB1 and the second substrate SUB2 are shaped in a flat plate parallel to the X-Y plane. The first substrate SUB1 and the second substrate SUB2 overlap each other in planar view. The first substrate SUB1 and the second substrate SUB2 are bonded to each other by the seal SE. The liquid crystal layer LC is disposed between the first substrate SUB1 and the second substrate SUB2 and sealed by the seal SE.

As enlarged and schematically shown in FIG. 1, the liquid crystal layer LC contains polymer 31 and liquid crystal molecules 32. For example, the polymer 31 is liquid crystal polymer. The polymer 31 is formed in a stripe shape extending along the first direction X and is aligned in the second direction Y. The liquid crystal molecules 32 are dispersed in gaps of the polymer 31 and aligned such that their major axes extend in the first direction X. Each of the polymer 31 and the liquid crystal molecules 32 has optical anisotropy or refractive anisotropy. The responsiveness of the polymer 31 to the electric field is lower than that of the liquid crystal molecules 32 to the electric field.

For example, the orientation of alignment of the polymers 31 is hardly changed irrespective of the presence or absence of the electric field. In contrast, the orientation of alignment of the liquid crystal molecules 32 is changed in accordance with the electric field in a state in which a voltage higher than or equal to the threshold value is applied to the liquid crystal layer LC. In a state in which the voltage is not applied to the liquid crystal layer LC, optical axes of the polymer 31 and the liquid crystal molecules 32 are parallel to each other and the light made incident on the liquid crystal layer LC is transmitted without being substantially scattered in the liquid crystal layer LC (transmitted state). In a state in which the voltage is applied to the liquid crystal layer LC, optical axes of the polymer 31 and the liquid crystal molecules 32 intersect each other and the light made incident on the liquid crystal layer LC is scattered in the liquid crystal layer LC (scattered state).

The display panel PNL includes a display area DA on which an image is displayed and a peripheral area PA which surrounds the display area DA in a frame shape. The seal SE is disposed in the peripheral area PA. The display area DA includes pixels PX arrayed in a matrix in the first direction X and the second direction Y.

As enlarged and shown in FIG. 1, each pixel PX comprises a switching element SW, a pixel electrode PE, a common electrode CE, a liquid crystal layer LC, and the like. The switching element SW is constituted by, for example, a thin-film transistor (TFT) and is electrically connected to a scanning line G and a signal line S. The scanning line G is electrically connected to the switching element SW in each of the pixels PX arranged in the first direction X. The signal line S is electrically connected to the switching element SW in each of the pixels PX arranged in the second direction Y.

The pixel electrode PE is electrically connected to the switching element SW. The common electrode CE is provided commonly to the plurality of pixel electrodes PE. The liquid crystal layer LC (particularly, liquid crystal molecules LC2) is driven by an electric field produced between the pixel electrode PE and the common electrode CE. A capacitor CS is formed, for example, between an electrode of the same electric potential as the common electrode CE and an electrode of the same potential as the pixel electrode PE.

The scanning line G, the signal line S, the switching element SW, and the pixel electrode PE are provided on the first substrate SUB1, and the common electrode CE is provided on the second substrate SUB2, which will be described with reference to FIG. 3. On the first substrate SUB1, the scanning line G and the signal line S are electrically connected to the flexible wiring board 1 or the IC chip 2.

The first substrate SUB1 has a pair of side surfaces E11 and E12 extending in the first direction X, and a pair of side surfaces E13 and E14 extending in the second direction Y. In the example shown in FIG. 1 and FIG. 2, the side surfaces E11 and E12 are the side surfaces formed along the longer sides, and the side surfaces E13 and E14 are the side surfaces formed along the shorter sides.

The second substrate SUB2 has a pair of side surfaces E21 and E22 extending in the first direction X, and a pair of side surfaces E23 and E24 extending in the second direction Y. In the example shown in FIG. 1 and FIG. 2, the side surfaces E21 and E22 are the side surfaces formed along the longer sides, and the side surfaces E23 and E24 are the side surfaces formed along the shorter sides.

In the example shown in FIG. 1 and FIG. 2, the side surfaces E12 and E22 overlap each other, the side surfaces E13 and E23 overlap each other, and the side surfaces E14 and E24 overlap each other, in planar view, but may not overlap.

The first substrate SUB1 includes an extending portion Ex1 which extends from the side surface E21 of the second substrate SUB2. From the other viewpoint, the extending portion Ex1 does not overlap the second substrate SUB2. The extending portion Ex1 corresponds to an end portion (first end portion) of the display panel PNL in the second direction Y, in planar view. The side surface E21 is located between the side surface E11 and the display area DA in planar view. Incidentally, the shape of the first substrate SUB1 and the second substrate SUB2 is not limited to the rectangular shape.

The flexible wiring board 1 and the IC chip 2 are mounted on the extending portion Ex1. The flexible wiring board 1 is, for example, a flexible printed circuit board and is bent toward the wiring board 3 in the example shown in FIG. 1 and FIG. 2. The IC chip 2 incorporates, for example, a display driver which outputs a signal necessary for image display, and the like. Incidentally, the IC chip 2 may be mounted on the flexible wiring board 1.

In the example shown in FIG. 1 and FIG. 2, the display device DSP comprises a plurality of (for example, four) flexible wiring boards 1, but may comprise a single flexible wiring board 1. In addition, the display device DSP comprises a plurality of (for example, four) IC chips 2 but may comprise a single IC chip 2. For example, the display device DSP may comprise eight IC chips 2. Alternatively, the display device DSP may comprise a single IC chip 2.

The wiring board 3 is, for example, a flexible printed circuit. The wiring board 3 has more rigidity than, for example, the flexible wiring board 1. From the other viewpoint, the thickness of the wiring board 3 is larger than, for example, the thickness of the flexible wiring board 1. For this reason, the wiring board 3 is more difficult to bend than the flexible wiring board 1. The wiring board 3 is located on a side opposite to the light emitting module 100 with respect to the first substrate SUB1. As shown in FIG. 2, the wiring board 3 includes a connector 4. The flexible wiring board 1 is connected to the wiring board 3 via the connector 4. From the other viewpoint, the flexible wiring board 1 electrically connects the first substrate SUB1 to the wiring board 3.

Furthermore, the wiring board 3 is connected to a control unit (not shown) via a connector 5. Various signals and power supply voltages output from the control unit are output to the display panel PNL via the wiring board 3 and the flexible wiring board 1. The wiring board 3 has a side surface E31 at a position protruding from the side surface E11 of the first substrate SUB1. The side surface E11 is located between the side surface E21 and the side surface E31 in planar view.

Details of the light emitting module 100 will be described below, and the light emitting module 100 is provided along the side surface (or the end portion) of the display panel PNL. In the example shown in FIG. 1, the light emitting module 100 is provided at the extending portion Ex1. The light emitting module 100 includes a wiring board 101. The wiring board 101 is electrically connected to the outside via a connector 6 for inputting various signals and power supply voltages. The wiring boards 3 and 101 may include portions extending from the display panel PNL in the first direction X and a direction opposite to the first direction X.

Figure 3:
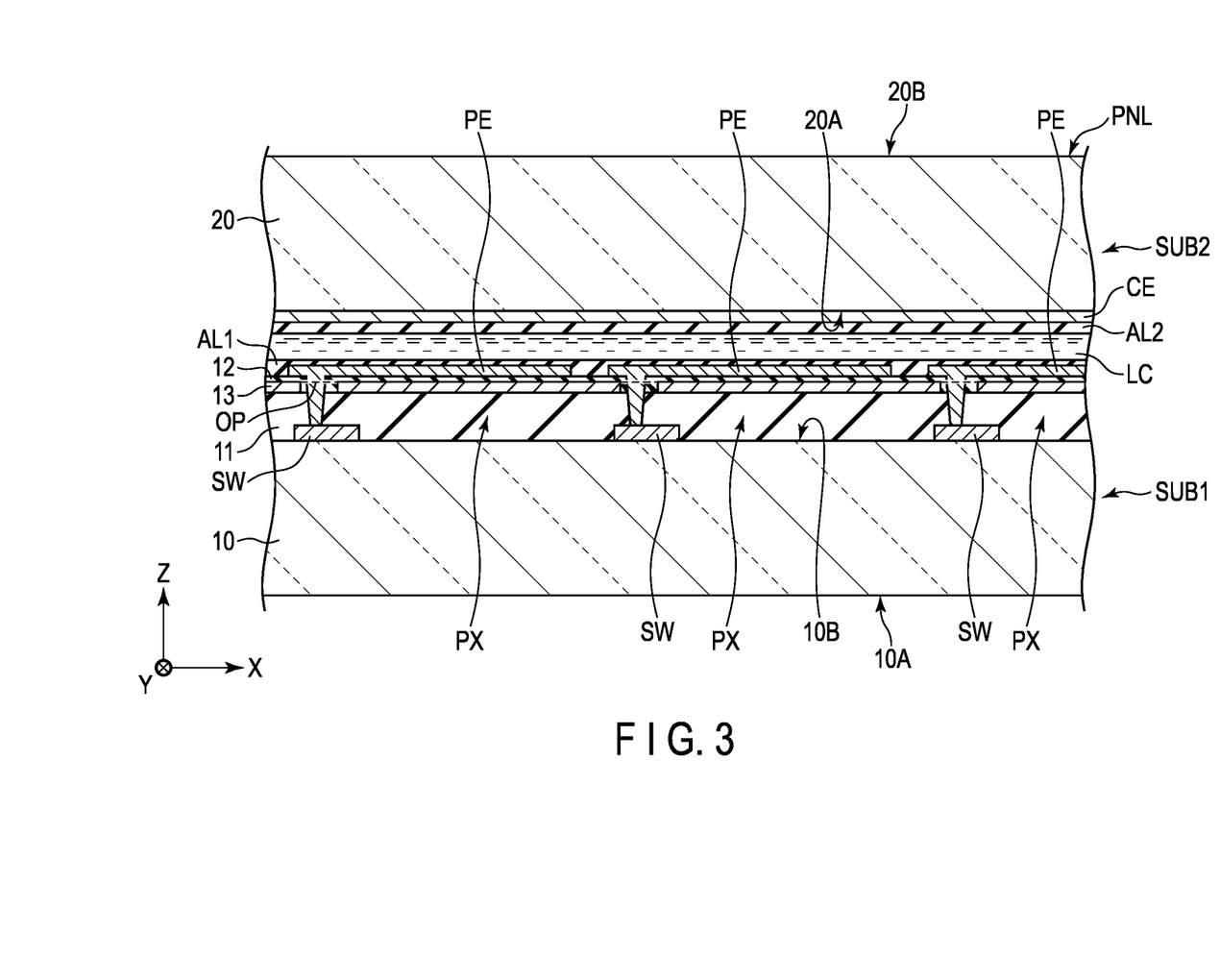
FIG. 3 is a cross-sectional view showing a configuration example of the display panel shown in FIG. 1 and FIG. 2.

FIG. 3 is a cross-sectional view showing a configuration example of the display panel shown in FIG. 1 and FIG. 2. The first substrate SUB1 includes a transparent substrate 10, insulating films 11 and 12, a capacitive electrode 13, the switching elements SW, the pixel electrodes PE, and an alignment film AL1. The transparent substrate 10 has a main surface 10A (second surface) and a main surface 10B (third surface) on a side opposite to the main surface 10A.

The switching elements SW are provided on the main surface 10B side. The insulating film 11 is provided on the main surface 10B to cover the switching elements SW. Incidentally, the scanning lines G and signal lines S shown in FIG. 1 are provided between the transparent substrate 10 and the insulating film 11 but their illustration is omitted here. The capacitive electrode 13 is provided between the insulating films 11 and 12.

The pixel electrode PE is provided between the insulating film 12 and the alignment film AL1, in each pixel PX. In other words, the capacitive electrode 13 is provided between the transparent substrate 10 and the pixel electrodes PE. The pixel electrodes PE are electrically connected to the switching elements SW through opening portions OP of the capacitive electrode 13. The pixel electrodes PE overlap the capacitive electrode 13 with the insulating film 12 sandwiched therebetween, to form capacitors CS of the pixels PX. The alignment film AL1 covers the pixel electrodes PE.

The second substrate SUB2 is opposed to the first substrate SUB1. The second substrate SUB2 includes a transparent substrate 20, the common electrode CE, and an alignment film AL2. The transparent substrate 20 has a main surface 20A and a main surface 20B (first surface) on a side opposite to the main surface 20A. The main surface 20A of the transparent substrate 20 faces the main surface 10B of the transparent substrate 10. The main surface 20B is located on a side opposite to the main surface 10A, on the display panel PNL.

The common electrode CE is provided on the main surface 20A. The alignment film AL2 covers the common electrode CE. The liquid crystal layer LC is located between the main surface 10B and the main surface 20A and is in contact with the alignment films AL1 and AL2. In the second substrate SUB2, a light-shielding layer may be provided just above each of the switching elements SW, the scanning lines G, and the signal lines S. Alternatively, a transparent insulating film may be provided between the transparent substrate 20 and the common electrode CE or between the common electrode CE and the alignment film AL2.

The common electrode CE is disposed across a plurality of pixels PX and opposed to a plurality of pixel electrodes PE in the third direction Z. In addition, the common electrode CE has the same potential as the capacitive electrode 13. The liquid crystal layer LC is located between the pixel electrodes PE and the common electrode CE.

The transparent substrates 10 and 20 are, for example, glass substrates, but may be insulating substrates such as plastic substrates. The insulating film 11 includes, for example, a transparent inorganic insulating film of silicon oxide, silicon nitride, silicon oxynitride or the like, and a transparent organic insulating film of acrylic resin or the like. The insulating film 12 is, for example, an inorganic insulating film of a silicon nitride or the like. The capacitive electrode 13, the pixel electrodes PE, and the common electrode CE are transparent electrodes formed of, for example, a transparent conductive material such as indium tin oxide (ITO) or indium zinc oxide (IZO).

Figure 4:
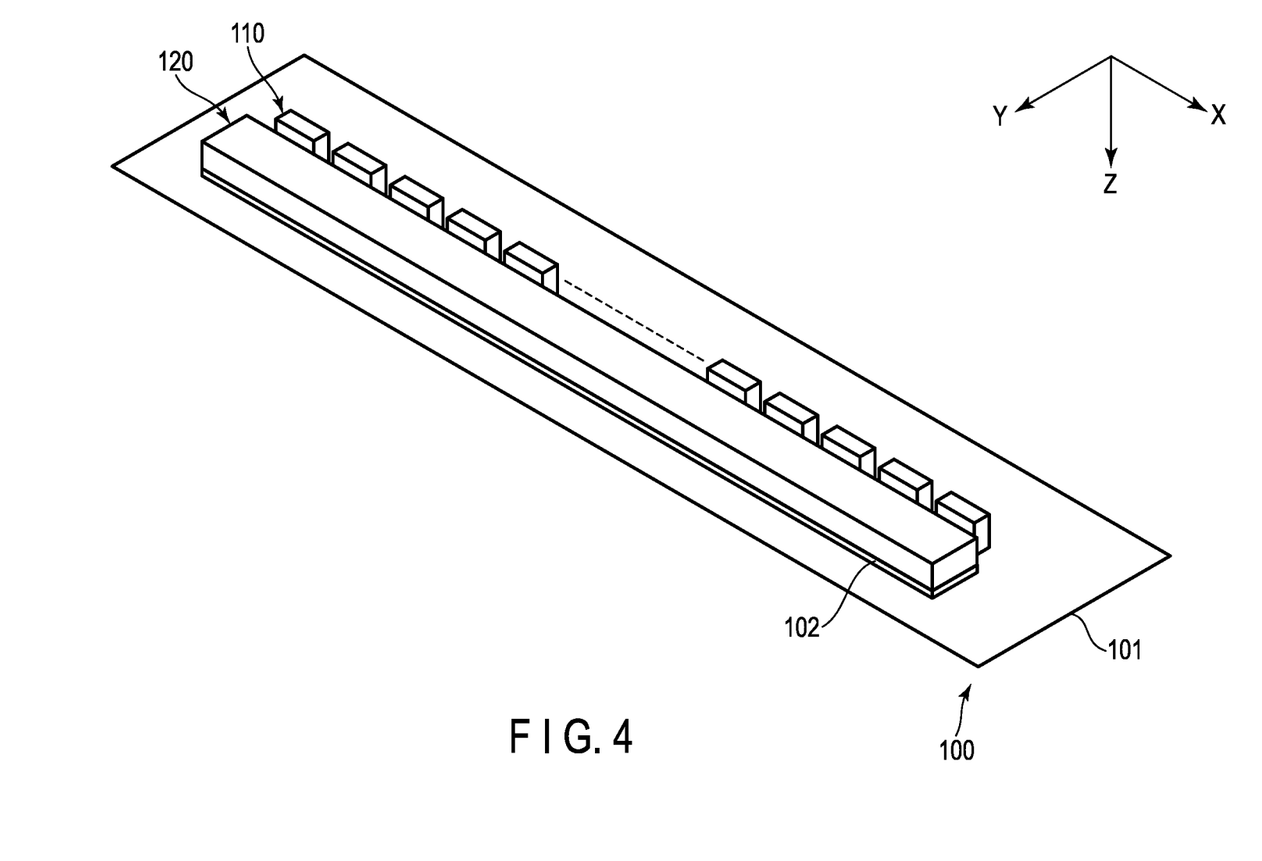
FIG. 4 is a perspective view showing a configuration example of a light emitting module shown in FIG. 1.

FIG. 4 is a perspective view showing a configuration example of the light emitting module 100 shown in FIG. 1. The light emitting module 100 comprises a wiring board 101, an adhesive layer 102, a plurality of light sources 110, and a light guide (for example, prism lens) 120.

The plurality of light sources 110 are opposed to the light guide 120 in the second direction Y. The plurality of light sources 110 are spaced apart with intervals along the first direction X and electrically connected to the wiring board 101.

In the light sources 110, red LEDs, green LEDs, and blue LEDs are continuously aligned. Alternatively, the light sources 110 are not limited to an arrangement in which LEDs of three different colors are continuously aligned, but, for example, only white light sources emitting white light may be continuously aligned.

The light guide 120 is formed of, for example, resin and shaped in a transparent rod, and extends along the first direction X. In addition, the light guide 120 has, for example, a plurality of curved surfaces corresponding to the respective light sources 110, to control the width in the first direction X of the light emitted from the light sources 110. The light guide 120 is bonded to the wiring board 101 by the adhesive layer 102. The light guide 120 may be constituted by a plurality of light guides. The number of light sources 110 and light guides 120 in the light emitting module 100 is not limited to the illustrated example.

Figure 5:
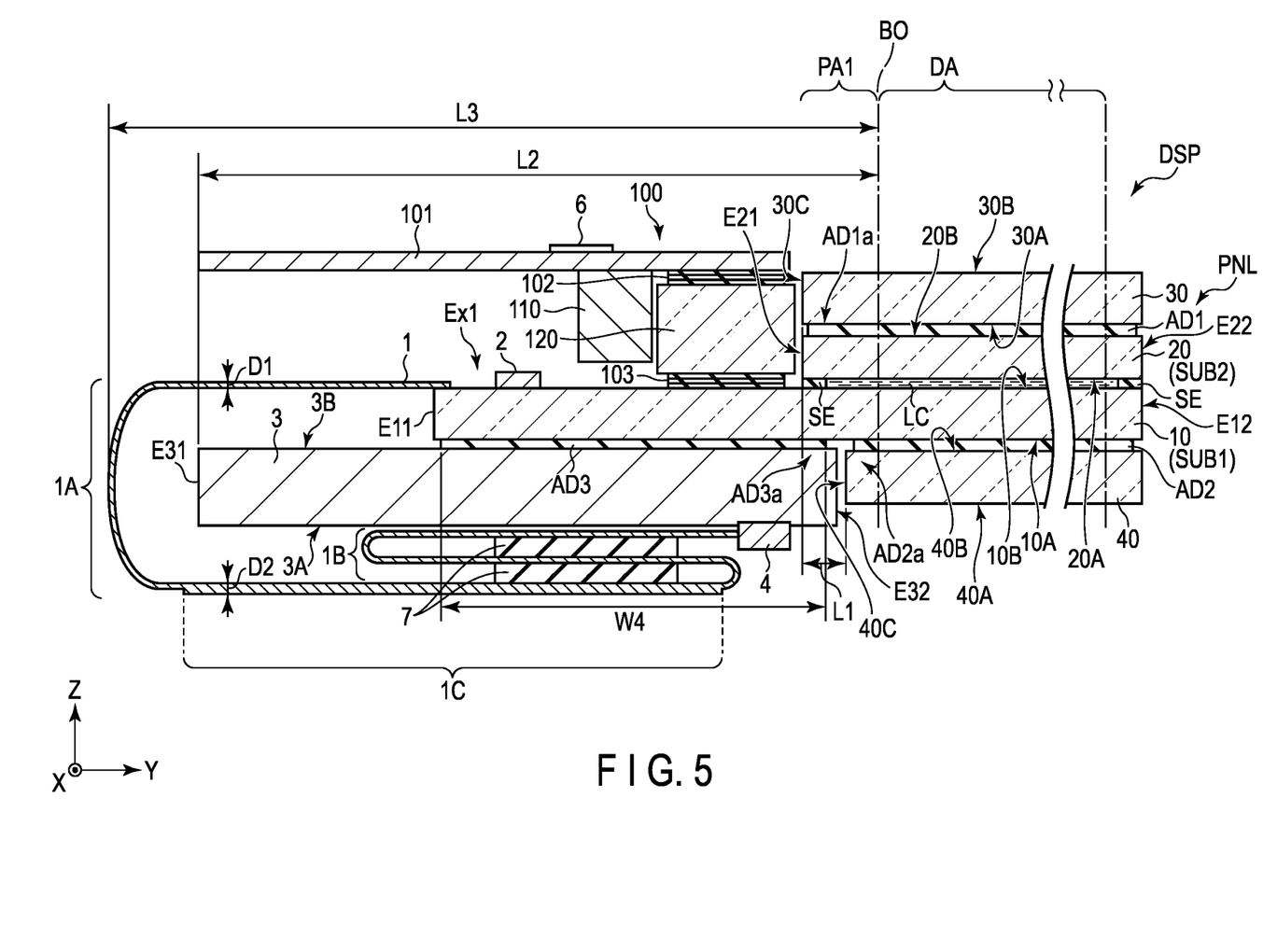
FIG. 5 is a cross-sectional view showing a configuration example of the display device of the embodiment.

FIG. 5 is a cross-sectional view showing a configuration example of the display device DSP of the embodiment. As described above, the display device DSP comprises the display panel PNL, the flexible wiring board 1, the IC chip 2, the wiring board 3, and the light emitting module 100. The only main parts of the display panel PNL are simply illustrated.

The display device DSP further comprises an adhesive layer AD1 (first adhesive layer) bonding the first cover member 30, the second cover member 40, the second substrate SUB2 and the first cover member 30, an adhesive layer AD2 (second adhesive layer) bonding the first substrate SUB1 and the second cover member 40, and an adhesive layer AD3 bonding the first substrate SUB1 and the wiring board 3. In the example shown in FIG. 5, the first cover member 30 and the second cover member 40 overlap the display area DA in the third direction Z, but do not overlap the extending portion Ex1.

In the second substrate SUB2, the transparent substrate 20 has the side surface E21 (third side surface). As described with reference to FIG. 1, the transparent substrate 10 has the side surface E11 (fourth side surface) that protrudes from the side surface E21 of the transparent substrate 20 in a direction opposite to the second direction Y, in the first substrate SUB1.

The first cover member 30 has a main surface 30A, a main surface 30B on the side opposite to the main surface 30A, and a side surface 30C (first side surface). The main surfaces 30A and 30B are the surfaces parallel to the X-Y plane. The main surface 30A is opposed to the main surface 20B of the transparent substrate 20. The side surface 30C is the surface substantially parallel to an X-Z plane defined by the first direction X and the third direction Z. The side surface 30C is close to the extending portion Ex1 in the second direction Y. The side surface 30C is located on the light emitting module 100 side in the second direction Y. In the example shown in FIG. 5, the side surface 30C is located directly above the side surface E21, but may be shifted in the direction Y.

The second cover member 40 has a main surface 40A, a main surface 40B on the side opposite to the main surface 40A, and a side surface 40C (second side surface). The main surfaces 40A and 40B are the surfaces parallel to the X-Y plane. The main surface 40B is opposed to the main surface 10A of the transparent substrate 10. The side surface 40C is the surface substantially parallel to the X-Z plane. The side surface 40C is close to the extending portion Ex1 in the second direction Y. The side surface 40C is located on the light emitting module 100 side in the second direction Y. The side surface 40C is opposed to the wiring board 3.

The side surface 40C is located on the display area DA side with respect to the side surface 30C in the second direction Y. In the example shown in FIG. 5, the side surface 40C is not located directly under the side surface 30C in the third direction Z, but overlaps the peripheral area PA1 between the side surface E21 (side surface 30C) and the display area DA. From the other viewpoint, the side surface 40C is located between the side surface 30C and the display area DA in the second direction Y, in planar view. The side surface 30C is located between the extending portion Ex1 and the side surface 40C in planar view. In contrast, in the example shown in FIG. 5, the side surface on the side opposite to the side surface 40C in the second cover member 40 is located directly below the side surface opposite to the side surface 30C.

The side surface 40C is separated from the side surface 30C at a distance L1 in the second direction Y. The size of the second cover member 40 becomes smaller than the size of the first cover member 30 by increasing the distance L1. The distance L1 can be varied appropriately. The side surface 40C is desirably as close to a boundary BO between the display area DA and the peripheral area PA1 as possible, for example, in a range overlapping the peripheral area PA1.

The adhesive layer AD1 bonds the main surface 20B of the transparent substrate 20 to the main surface 30A of the first cover member 30. The adhesive layer AD1 includes an end portion AD1a (second end portion) on the side surface 30C side in the second direction Y. The adhesive layer AD1 is not formed directly below the side surface 30C, but may be formed directly below the side surface 30C.

The adhesive layer AD2 bonds the main surface 10A of the transparent substrate 10 to the main surface 40B of the second cover member 40. The adhesive layer AD2 includes an end portion AD2a (third end portion) on the side surface 40C side in the second direction Y. The adhesive layer AD2 is not formed directly above the side surface 40C, but may be formed directly above the side surface 40C.

The adhesive layers AD1 and AD2 overlap the display area DA in the third direction Z. From the other viewpoint, the liquid crystal layer LC in the display area DA is located between the adhesive layers AD1 and AD2 in the third direction Z. The adhesive layers AD1 and AD2 can block, for example, most of ultraviolet rays. Blocking includes reflecting and absorbing ultraviolet rays, and the like. An influence of the ultraviolet rays included in the external light to the liquid crystal layer LC can be suppressed by forming the adhesive layers AD1 and AD2 so as to cover the display area DA.

The end portions AD1a and AD2a overlap the peripheral area PA1 in the third direction Z. The end portion AD2a is located on the display area DA side with respect to the end portion AD1a. In the example shown in FIG. 5, the end portion AD2a is located between the end portion AD1a and the display area DA, and between the side surface 40C and the display area DA, in the second direction Y. From the other viewpoint, the size of the adhesive layer AD1 is different from that of the adhesive layer AD2, and the size of the adhesive layer AD1 is smaller than that of the adhesive layer AD2. The adhesive layers AD1 and AD2 are formed of, for example, optical clear adhesive (OCA) or the like.

In the example shown in FIG. 5, each of the transparent substrate 10, the transparent substrate 20, the first cover member 30, and the second cover member 40 has a substantially equal thickness along the third direction Z. The first cover member 30 and the second cover member 40 are, for example, glass substrates, but may also be insulating substrates such as plastic substrates.

The light emitting module 100 overlaps the extending portion Ex1 in the third direction Z. The light sources 110 is provided between the extending portion Ex1 of the transparent substrate 10 and the wiring board 101, in the third direction Z. The light guide 120 is located between the light sources 110 and the side surface E21, and between the light sources 110 and the side surface 30C, in the second direction Y.

The light guide 120 is bonded to the wiring board 101 by the adhesive layer 102 and is bonded to the transparent substrate 10 by the adhesive layer 103. The adhesive layers 102 and 103 are, for example, double-sided tapes or the like. Each of the adhesive layers 102 and 103 is constituted by, for example, a reflective layer and adhesive layers formed on both sides of the reflective layer.

Next, light emitted from the light source 110 will be described. The light source 110 emits light toward at least one of the side surface 30C and the side surface E21. In the example shown in FIG. 5, the light source 110 emits light toward the side surface 30C and the side surface E21. The light emitted from the light source 110 is moderately diffused in the light guide 120, made incident on the transparent substrate 20 from the side surface E21, and made incident on the first cover member 30 from the side surface 30C.

The light made incident on the transparent substrate 20 and the first cover member 30 propagates through the interior of the display panel PNL while repeatedly reflected. The light made incident on the liquid crystal layer LC to which no voltage is applied is transmitted through the liquid crystal layer LC while hardly scattered.

In addition, the light made incident on the liquid crystal layer LC to which the voltage is applied is scattered in the liquid crystal layer LC. The display device DSP allows images to be observed from the main surface 30B side and also allows images to be observed from the main surface 40A side. In addition, when the display device DSP is observed from the main surface 30B side or observed from the main surface 40A side, a background of the display device DSP can be observed via the display device DSP.

The wiring board 3 has a main surface 3B (fourth surface) opposed to the main surface 10A (second surface), a main surface 3A (fifth surface) on a side opposite to the main surface 3B, and a pair of side surfaces E31 and E32. The connector 4 to which the flexible wiring board 1 is connected is provided on the main surface 3A. The pair of side surfaces E31 and E32 are the surfaces substantially parallel to the X-Z plane.

The wiring board 3 protrudes from the side surface E11 of the transparent substrate 10. From the other viewpoint, the side surface E31 protrudes from the side surface E11 of the transparent substrate 10 in the direction opposite to the second direction Y. The side surface E32 is located on the side opposite to the side surface E31 and opposed to the side surface 40C of the second cover member 40.

The adhesive layer AD3 bonds the main surface 10A of the transparent substrate 10 to the main surface 3B of the wiring board 3. The adhesive layer AD3 includes an end portion AD3a on the side surface E32 side in the second direction Y. The adhesive layer AD3 is not formed directly above the side surface E32 of the wiring board 3, but may be formed directly above the side surface E32. The adhesive layer AD3 is, for example, a double-sided tape or the like.

The side surface E32 of the wiring board 3 overlaps the peripheral area PA1 in the third direction Z. From the other viewpoint, the side surface E32 is located between the side surface 40C and the side surface 30C in the second direction Y. In the example shown in FIG. 5, the wiring board 3 overlaps the first cover member 30 and the transparent substrate 20, in the thickness direction (third direction Z) of the display panel PNL. In addition, the side surface E32 does not overlap the light emitting module 100. The wiring board 3 overlaps the first cover member 30, but does not overlap the second cover member 40 in planar view.

The end portion AD3a of the adhesive layer AD3 overlaps the peripheral area PA1 in the third direction Z. From the other viewpoint, the end portion AD3a is located between the side surface 30C and the side surface 40C in the second direction Y. In the example shown in FIG. 5, the end portion AD3a overlaps the first cover member 30 and the transparent substrate 20, in the third direction Z. In addition, the end portion AD3a may overlap the end portion AD1a of the adhesive layer AD1 in the third direction Z.

Since the side surface 40C of the second cover member 40 is separated from the side surface 30C of the first cover member 30 to the display area DA side at the distance L1 in the second direction Y, the wiring board 3 can be disposed on the transparent substrate 20, closely to the display area DA side. The position of the side surface E32 in the second direction Y can be changed appropriately in accordance with the position of the side surface 40C. The wiring board 3 can be made closer to the display area DA side by increasing the distance L1. In addition, parts of the wiring board 3 and the transparent substrate 10 which overlap each other become broader by disposing the wiring board 3 on the transparent substrate 10 so as to be close to the display area DA side.

The flexible wiring board 1 is mounted on the extending portion Ex1 to be opposed to the main surface 10B of the transparent substrate 10, and is bent to the main surface 10A side. The flexible wiring board 1 includes a first bend portion 1A, a second bend portion 1B, and a thick portion 1C between the first bend portion 1A and the second bend portion 1B. At the thick portion 1C, lines are formed on both surfaces of the base material formed of, for example, polyimide or the like.

A thickness D2 of the thick portion 1C is larger than a thickness D1 of parts other than the thick portion 1C (D2>D1). From the other viewpoint, the thick portion 1C has more rigidity than the parts other than the thick portion 1C and can hardly be bent. In addition, for example, the length of the thick portion 1C in the first direction X is substantially equal to the length of the first bend portion 1A in the first direction X and longer than the length of the second bend portion 1B in the first direction X.

The flexible wiring board 1 is bent to straddle the wiring board 3 by the first bend portion 1A. The thick portion 1C is located below the wiring board 3 and is not bent. The flexible wiring board 1 is further bent at the second bend portion 1B below the wiring board 3. A part of the flexible wiring board 1 is located between the wiring board 3 and the thick portion 1C of the flexible wiring board 1 by the second bend portion 1B.

In the example shown in FIG. 5, the flexible wiring board 1 is bent twice at the second bend portion 1B. Furthermore, an adhesive layer 7 is provided between the thick portion 1C and the second bend portion 1B, and between the second bend portion 1B and the second bend portion 1B. The adhesive layer 7 is, for example, a double-sided tape or the like. Extension of the flexible wiring board 1 in the third direction Z is suppressed by the adhesive layer 7.

Figure 6:
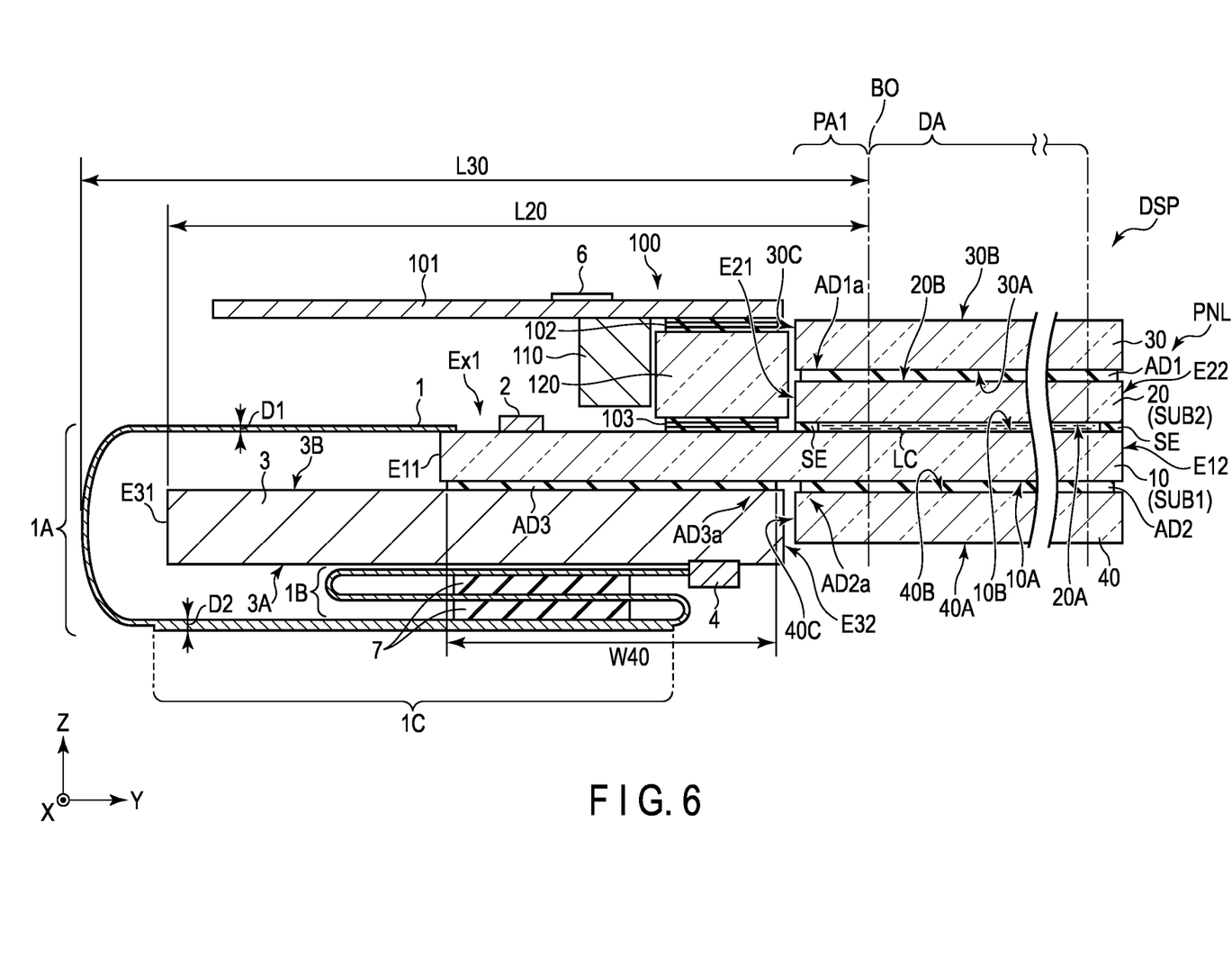
FIG. 6 is a cross-sectional view showing a comparative example of the display device shown in FIG. 5.

FIG. 6 is a cross-sectional view showing a comparative example of the display device DSP shown in FIG. 5. In the example shown in FIG. 6, the side surface 40C of the second cover member 40 is located directly below the side surface 30C of the first cover member 30 in the third direction Z. The side surface 30C, the side surface E21, and the side surface 40C are aligned in the third direction Z. From the other viewpoint, the size of the second cover member 40 is substantially equal to the size of the first cover member 30. The size of the adhesive layer AD2 is substantially equal to, for example, the size of the adhesive layer AD1. The flexible wiring board 1 is mounted on the transparent substrate 10, at the same position as that in the case shown in FIG. 5.

The wiring board 3 shown in FIG. 6 is located on the left side from the wiring board 3 shown in FIG. 5 with respect to the transparent substrate 10. In other words, the side surface E31 of the wiring board 3 protrudes in a direction opposite to the second direction Y with respect to the side surface E11 of the transparent substrate 10, in the case shown in FIG. 5. In addition, for example, the side surface E32 of the wiring board 3 shown in FIG. 6 is located directly below the light guide 120 in the third direction Z.

A distance L20 from the display area DA to the side surface E31 as shown in FIG. 6 is longer than the distance L2 from the display area DA to the side surface E31 as shown in FIG. 5 (L20>L2). Furthermore, a distance L30 from the display area DA to a part of the first bend portion 1A which protrudes most to the direction opposite to the second direction Y as shown in FIG. 6 is longer than the distance L3 from the display area DA to a part of the first bend portion 1A which protrudes most to the direction opposite to the second direction Y as shown in FIG. 5 (L30>L3). In the display device DSP shown as the comparative example in FIG. 6, a portion located in the direction opposite to the second direction Y, including the peripheral area PA1 from the display area DA, or so-called a frame portion is larger than the display device DSP shown in FIG. 5.

The distance L2 is made shorter than the distance L20 by disposing the wiring board 3 closely to the display area DA side as shown in FIG. 5. For this reason, the distance L3 becomes shorter than the distance L30 when the flexible wiring board 1 is bent. Furthermore, overlapping parts of the wiring board 3 and the transparent substrate 10 become wider in the third direction Z. From the other viewpoint, a width W4 of the adhesive layer AD3 in the second direction Y as shown in FIG. 5 is larger than a width W40 of the adhesive layer AD3 in the second direction Y as shown in FIG. 6 (W4>W40). In other words, margin for bonding the adhesive layer AD3 to the transparent substrate 10 can be secured largely by making the overlapping parts of the wiring board 3 and the transparent substrate 10 wider.

As described above, according to the present embodiment, a display device capable of allowing the frame to be narrowed can be provided. In other words, the wiring board 3 can be disposed closely to the display area DA side by locating the side surface 40C of the second cover member 40 more closely to the display area DA side than the side surface 30C of the first cover member 30. For this reason, since the distance L2 from the display area DA to the side surface E31 becomes shorter, and since the distance L3 from the display area DA to the part of the first bend portion 1A which protrudes most in the direction opposite to the second direction Y can be made shorter, the narrowing the frame can be implemented in the display device DSP.

Furthermore, the wiring board 3 can be firmly bonded to the transparent substrate 10 by making the overlapping parts of the wiring board 3 and the transparent substrate 10 wider in the third direction Z and making the area of bonding the adhesive layer AD3 to the transparent substrate 10 and the wiring board 3 wider. In the display device DSP according to the embodiment, narrowing the frame can be implemented while securing the bonding force of bonding the adhesive layer AD3 to the wiring board 3 and the transparent substrate 10. Moreover, the above-described various advantages can be obtained from the embodiment.

In the embodiment, the side surface 40C overlaps the peripheral area PA1, but the side surface 40C may overlap the boundary BO in the third direction Z. In this case, the distance L1 is substantially equal to the distance from the side surface 30C to the boundary BO. In addition, the side surface 40C may overlap the display area DA of the display panel PNL.

All of the display devices that can be implemented by a person of ordinary skill in the art through arbitrary design changes to the display devices described above as embodiments of the present invention come within the scope of the present invention as long as they are in keeping with the spirit of the present invention. Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A display device comprising:
a display panel having a first surface, a second surface on a side opposite to the first surface, and a display area including pixels;
a first cover member overlapping the display area and opposed to the first surface;
a second cover member overlapping the display area and opposed to the second surface;
a light source; and
a printed circuit board, wherein
the first cover member has a first side surface close to a first end portion of the display panel,
the second cover member has a second side surface close to the first end portion,
the first side surface is located between the first end portion and the second side surface in planar view,
the display panel includes a first substrate having the second surface, a second substrate having the first surface and opposed to the first substrate, and a liquid crystal layer disposed between the first substrate and the second substrate,
the second substrate has a third side surface,
the light source emits light to at least one of the first side surface and the third side surface, and
the printed circuit board is opposed to the second surface and opposed to the second side surface.

2. The display device of claim 1, wherein
the second side surface is located between the first side surface and the display area in planar view.

3. The display device of claim 1, further comprising:
a first adhesive layer bonding the second substrate to the first cover member; and
a second adhesive layer bonding the first substrate to the second cover member,
wherein
the first adhesive layer includes a second end portion, and
the second adhesive layer includes a third end portion located on the display area side with respect to the second end portion.

4. The display device of claim 3, wherein
the first adhesive layer and the second adhesive layer overlap the display area.

5. The display device of claim 4, wherein
the first adhesive layer and the second adhesive layer block ultraviolet rays.

6. The display device of claim 1, further comprising:
a flexible wiring board electrically connecting the first substrate with the printed circuit board and being opposed to a third surface on a side opposite to the second surface of the first substrate.

7. The display device of claim 6, wherein
the printed circuit board has a fourth surface opposed to the second surface, a fifth surface on a side opposite to the fourth surface, and a connector provided on the fifth surface, and
the flexible wiring board is bent to a side of the second surface of the first substrate and is connected to the connector.

8. The display device of claim 1, wherein
the first substrate has a fourth side surface protruding from the third side surface, and
the printed circuit board protrudes from the fourth side surface.

9. A display device comprising:
a display panel having a first surface, a second surface on a side opposite to the first surface, and a display area including pixels;
a first cover member overlapping the display area and opposed to the first surface;
a second cover member overlapping the display area and opposed to the second surface;
a printed circuit board opposed to the second surface, overlapping the first cover member in planar view, and not overlapping the second cover member in planar view;
a light source; and
a flexible wiring board, wherein
the display panel includes a first substrate having the second surface, a second substrate having the first surface and opposed to the first substrate, and a liquid crystal layer disposed between the first substrate and the second substrate, the light source emits light to at least one of the second substrate and the first cover member, and the flexible wiring board electrically connects the first substrate with the printed circuit board and is opposed to a third surface on a side opposite to the second surface of the first substrate.

10. The display device of claim 9, wherein the printed circuit board has a fourth surface opposed to the second surface, a fifth surface on a side opposite to the fourth surface, and a connector provided on the fifth surface, and the flexible wiring board is bent to a side of the second surface of the first substrate and is connected to the connector.

11. The display device of claim 9, further comprising:

an adhesive layer bonding the second surface to the printed circuit board, wherein the adhesive layer overlaps the first cover member in a thickness direction of the display panel.

12. A display device comprising:

a display panel having a first surface, a second surface on a side opposite to the first surface, and a display area including pixels;

a first cover member overlapping the display area and opposed to the first surface;

a second cover member overlapping the display area and opposed to the second surface;

a printed circuit board opposed to the second surface, overlapping the first cover member in planar view, and not overlapping the second cover member in planar view;

a light source; and an adhesive layer, wherein the display panel includes a first substrate having the second surface, a second substrate having the first surface and opposed to the first substrate, and a liquid crystal layer disposed between the first substrate and the second substrate, the light source emits light to at least one of the second substrate and the first cover member, and the adhesive layer bonds the second surface to the printed circuit board and overlaps the first cover member in a thickness direction of the display panel.

* * * * *